United States Patent
Blais et al.

(10) Patent No.: US 9,971,337 B2
(45) Date of Patent: May 15, 2018

(54) MACHINE TOOL CERTIFICATION FOR PART SPECIFIC WORKING VOLUME

(71) Applicant: Pratt & Whitney Canada Corp., Longueuil (CA)

(72) Inventors: Mario Blais, Varennes (CA); Philippe St-Jacques, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1254 days.

(21) Appl. No.: 14/036,081

(22) Filed: Sep. 25, 2013

(65) Prior Publication Data

US 2015/0088299 A1    Mar. 26, 2015

(51) Int. Cl.
*G05B 19/18*     (2006.01)
*G05B 19/401*    (2006.01)

(52) U.S. Cl.
CPC .. *G05B 19/401* (2013.01); *G05B 2219/37008* (2013.01)

(58) Field of Classification Search
CPC .................................................. G05B 19/18
See application file for complete search history.

(56) References Cited

U.S. PATENT DOCUMENTS

| | | | |
|---|---|---|---|
| 4,408,405 A | 10/1983 | Williams et al. | |
| 4,819,195 A | 4/1989 | Bell et al. | |
| 4,945,501 A | 7/1990 | Bell et al. | |
| 4,974,165 A | 11/1990 | Locke et al. | |
| 5,313,410 A | 5/1994 | Watts | |
| 5,543,933 A | 8/1996 | Kang et al. | |
| 5,659,478 A | 8/1997 | Pennisi et al. | |
| 5,841,668 A | 11/1998 | Pahk et al. | |
| 5,903,459 A * | 5/1999 | Greenwood | G05B 19/401 700/108 |
| 6,161,079 A | 12/2000 | Zink et al. | |
| 6,415,191 B1 | 7/2002 | Pryor | |
| 6,839,606 B2 | 1/2005 | Landers et al. | |
| 6,909,517 B2 | 6/2005 | Coleman et al. | |
| 7,073,239 B2 | 7/2006 | Miller | |
| 7,509,222 B2 | 3/2009 | Edge | |
| 8,229,208 B2 | 7/2012 | Pulla et al. | |

FOREIGN PATENT DOCUMENTS

EP    1 596 160 A1    11/2005

OTHER PUBLICATIONS

Weckenmann et al., "Monitoring Coordinate Measuring Machines by User-Defined Calibrated Parts", 2007 Springer.*
Ramesh et al., "Error compensation in machine tools—a review Part II: thermal errors", 2000 Elsevier Science Ltd.*

* cited by examiner

*Primary Examiner* — Carlos Ortiz Rodriguez
(74) *Attorney, Agent, or Firm* — Norton Rose Fulbright Canada LLP

(57) ABSTRACT

A method for machining a selected part with a machine tool, comprises obtaining a master part replicating at least a portion of a geometry of a selected part. The master part is loaded in a machine tool. A signature of the machine tool is defined by measuring at least dimensional data of the master part relative to the machine tool, the dimensional data being limited to a selected-part-specific working volume substantially smaller than a complete working volume of the machine tool. The machine tool is certified as being within tolerances to machine the selected part within the working volume, using the dimensional data of the signature. The selected part is machined from a workpiece with the machine tool.

11 Claims, 1 Drawing Sheet

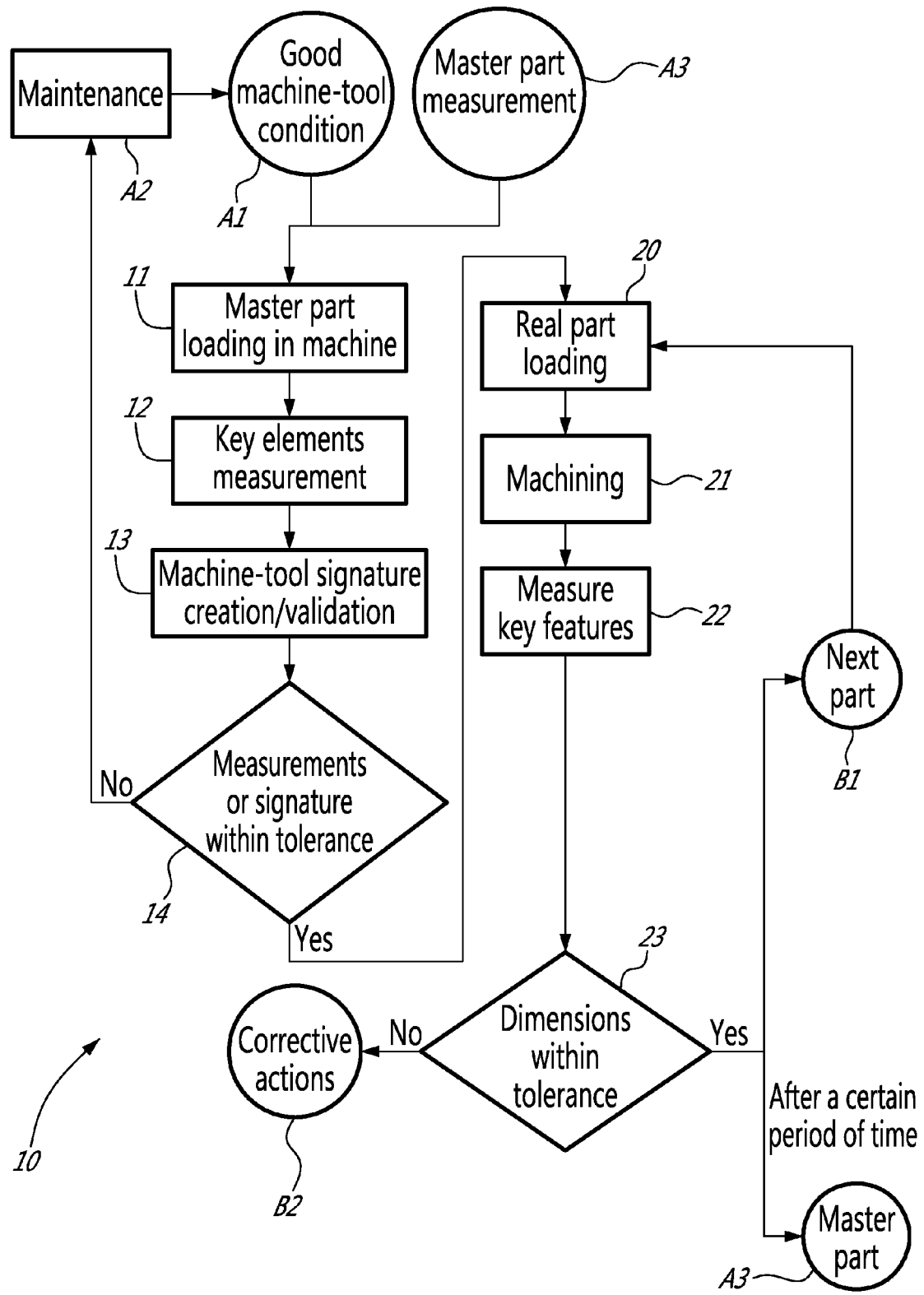

MACHINE TOOL CERTIFICATION FOR PART SPECIFIC WORKING VOLUME

TECHNICAL FIELD

The application relates generally to machine tool tolerance certification in the production of machined parts.

BACKGROUND OF THE ART

In the field of machine tools, it is customary practice to certify an accuracy of a machine tool, in light of the production of parts or pieces by the machine tool.

One known certification method is described in EP 1 596 160, filed on May, 10, 2004, for a coordinate measuring machine (CMM). The CMM and like measuring machines are by definition certified for a quantified accuracy within a complete working envelope. The CMM is a cartesian machine that has a relatively simple axis stack-up configuration, whereby machine errors are relatively easy to compensate, as axes are not coupled.

While CMMs are relative simple, some machine tools, such as 5-axis milling or mill-turn machines, have a more complex axis configuration. Accordingly, for such machines, volumetric errors are harder to predict and compensate. The determination of volumetric errors for the complete working envelope of such machines would prove complex, time consuming, and hence inefficient.

SUMMARY

In one aspect, there is provided a method for machining a selected part with a machine tool, comprising: i) obtaining a master part replicating at least a portion of a geometry of a selected part; ii) loading the master part in a machine tool; iii) defining a signature of the machine tool by measuring at least dimensional data of the master part relative to the machine tool, the dimensional data being limited to a selected-part-specific working volume substantially smaller than a complete working volume of the machine tool; iv) certifying that the machine tool is within tolerances to machine the selected part within the working volume, using the dimensional data of the signature; and v) machining at least one of the selected part from a workpiece with the machine tool.

Further details of these and other aspects of the present invention will be apparent from the detailed description and FIGURES included below.

DESCRIPTION OF THE DRAWINGS

Reference is now made to the accompanying FIGURES, in which:

FIG. 1 is a flowchart showing a method for certifying a part specific working volume of a machine tool.

DETAILED DESCRIPTION OF THE PREFERRED EMBODIMENTS

Referring to FIG. 1, there is shown at 10 a method for certifying a part-specific working volume of a machine tool, for the machine tool to produce such part within tolerances. The machine tool may be any appropriate machine tool machining pieces, such as milling machines, mill-turn machines, turning machines, etc, of the type having a clamping unit (e.g., chuck) for holding a workpiece, and a tool(s) for machining the workpiece clamped to the clamping unit, into a part. Such machine tools are of the type having a reference coordinate system comprising position data for at least one axis. The method 10 may be used with machine tools with numerical control. The part-specific working volume is a fraction of the complete working envelope of the machine tool, the fraction being associated to the geometrical dimensions of a selected part to be produced. The certification of the machine tool is hence part specific.

As a starting point, the machine tool must be in a good condition as shown as A1, having gone through appropriate maintenance A2 (maintenance A2 including appropriate repairs if necessary). Also, master part A3 is used, along with its precise measurement and dimensional data. The master part A3 is precisely inspected to gather complete knowledge of its geometrical condition, using appropriate metrology techniques, in the form of dimensional and orientation data. The master part A3 may match the geometry and material of the selected part B1 to be produced as a product of the method 10.

A sequence of steps 11-13 is now described in a workflow illustrating the creation of a signature for the machine tool. These steps 11-13 are repeated at a later time in a validation of the signature, as will be described subsequently.

According to 11, the master part A3 is loaded in the machine tool. The master part A3 is loaded and clamped in similar fashion to the clamping of the selected part in the machine tool once machined, i.e., to occupy the same working volume as would the selected parts B1.

According to 12, specific element(s) is(are) measured in the master part A3 loaded in the machine tool. An appropriate measuring device is used for the measurement. The measuring may be performed by contact (e.g., using probes, etc), or may be contactless using optical sensors. In an embodiment, the probes and/or measuring device may be an integral part of the machine tool, or are releasably mounted to the machine in a predetermined and known manner. Thermal conditions may be varied and measured in 12, to quantify the effects of thermal variations on the machine tool.

According to 13, using the measurements of 12, a machine tool signature is created, or may be validated as will be described hereinafter when steps 11-13 are repeated at a later time in the validation of the signature. The machine tool signature comprises dimensional data relating the specific elements to a reference(s) of the machine tool, for instance in relation to the reference coordinate system of the machine tool (e.g., X-, Y-, Z-axis coordinates). The reference(s) of the machine tool may also be a specific element of the tool of the machine tool. The machine tool signature may also comprise orientation data pertaining to the orientation of the master part in the machine tool, as well as environmental data such as environing temperature. The dimensional data therefore covers a specific volume defined by the size of the master part. Hence, the signature covers a working volume that is a fraction of the complete working envelope of the machine tool.

According to decision 14, when steps 11-13 have been performed to create a signature, if the dimensional data obtained is within tolerances, the machine tool is certified for machining the selected parts, and the selected part may be thus machined. For instance, the dimensional data obtained through numerical or visual displays/scales on the machine tool (e.g., the reference coordinate system of the machine tool) is compared to the precise master part measurements as in A3. If the dimension data is outside tolerances, the machine tool is attended to, for repair, maintenance and/or calibration, as in A2, and the steps 11-13 are repeated to create a signature for the machine tool, and control the machine tool via decision 14.

A sequence of steps 20-22 of the method 10 is now described in a workflow illustrating the machining of the part, as opposed to the creation/validation of a signature of a master part in steps 11-13.

According to 20, a workpiece is loaded in the machine tool.

According to 21, the workpiece is machined into the selected part.

According to 22, a specific feature(s) of the machined part is(are) measured using metrology techniques and/or an appropriate measuring device.

According to decision 23, the specific feature(s) of the machined part is(are) compared to the desired part dimensions, to determine a magnitude of variation, if any, between the desired dimensions of the selected part (e.g., the design dimensions, the virtual dimensions, the drawing tolerances) and the machined selected part. If the magnitude of variation is within tolerances, another part B1 may be machined. The steps 20-22 are repeated for a predetermined amount of time (e.g., in time, in number of cycles/number of parts, etc).

If the magnitude of variation is outside tolerances, the machine tool no longer has the certification to machine the selected part. Corrective actions B2 are taken, for instance by maintenance A2 or through repair of the machine, after which steps 11-13 are performed, to recertify the machine tool to machine the given part.

Once the amount of time has lapsed, the master part A3 is used to reproduce the sequence of steps 11-13 to validate the signature. In step 13, instead of creating a signature, the dimensional data and the like obtained in step 12 is used to validate the signature of the machine tool relative to the reference coordinate system of the machine tool. If the signature is within tolerances, the machine is certified to machine the part, and parts may be machined according to steps 20-22. If the signature is outside tolerances, the machine tool certification lapses, and maintenance A2 or repair is performed. In both cases, the validation step may give information about machine geometrical condition change, as the master part A3 is unaltered.

The method 10 may offer operators of machine tools real-time capability in certifying a machine tool and producing a specific part. The method 10 may allow the elimination of systematic inspection at the end of the machine operations, and help define a proactive preventive maintenance schedule, based for instance on data gathered from the correction actions B2 or from the validation using steps 11-13, which performance history data could form part of the signature, as well as a machine log. Moreover, machine tools may be segregated in relation to their capability (roughing vs finishing) based on the performance history data captured as signature.

As mentioned previously, the part specific working volume is a fraction of the complete working envelope of the machine tool, and thus the method 10 is a simplification over a certification for the complete working envelope of the machine tool. The part-specific working volume may be in numerous embodiments at most the size of the machined part (and thus of the master part). In some embodiments, the part-specific working volume may be as small as a single cutting location or cylinder in the case of a turning machine.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A method for machining a selected part with a machine tool having a working volume, the method comprising:
    i) obtaining a master part replicating at least a portion of a geometry of a selected part, the master part having a part-specific working volume substantially smaller than the complete working volume of the machine tool, the part-specific working volume being associated to geometrical dimensions of the selected part;
    ii) loading the master part in the machine tool;
    iii) defining a signature of the machine tool by measuring dimensional data of the part-specific working volume relative to a reference of the machine tool, the signature comprising the dimensional data of the part-specific working volume of the master part in relation to the reference of the machine tool;
    iv) certifying that the machine tool is within tolerances to machine the selected part within the working volume of the machine tool, using only the dimensional data of the part-specific working volume of the signature; and
    v) machining at least one of the selected part from a workpiece with the machine tool.

2. The method according to claim 1, further comprising repeating steps i) and ii) for validating the signature after machining numerous ones of the selected part in step v); and machining at least one of the selected part with the machine tool after the validating.

3. The method according to claim 2, wherein the repeating is performed after one of: a given number of the selected parts machined in step v) is reached; and a given amount of time has lapsed.

4. The method according to claim 2, wherein the validating comprises updating the signature as a function of variations in the dimensional data between the defining of the signature and the validating of the signature.

5. The method according to claim 1, wherein defining the signature of the machine tool comprises defining a working volume that is smaller or equal to the selected part.

6. The method according to claim 1, wherein defining the signature comprises adding an orientation of the master part relative to the machine tool.

7. The method according to claim 1, wherein defining the signature comprises adding a temperature of an environment of the machine tool.

8. The method according to claim 1, wherein defining the signature comprises adding a work log of the machine tool.

9. The method according to claim 1, further comprising measuring the selected part after the machining, and repeating steps i), ii) and iii) if the selected part is outside tolerances.

10. The method according to claim 1, wherein machining a selected part with a machine tool comprises machining the selected part with a numerical control machine tool, and wherein defining the signature comprises measuring the dimensional data relative to a reference coordinate system of the numerical control machine tool.

11. The method according to claim 1, further comprising performing steps i), ii), iii) and iv) with another master part to machine another selected part.

* * * * *